United States Patent [19]

Buchser

[11] Patent Number: 5,050,777
[45] Date of Patent: Sep. 24, 1991

[54] ICE DISPENSER CONVEYING APPARATUS HAVING A ROTATING BLADE AUGER THAT OPERATES IN CONNECTION WITH A BAFFLE OPENING TO PREVENT WEDGING OF ICE BODIES THEREBETWEEN

[75] Inventor: William J. Buchser, Evansville, Ind.

[73] Assignee: Whirlpool Corporation, Benton Harbor, Mich.

[21] Appl. No.: 459,651

[22] Filed: Jan. 2, 1990

[51] Int. Cl.$^5$ ............................................. B67D 5/62
[52] U.S. Cl. ................... 222/146.6; 222/240; 222/413; 62/344; 198/550.1; 198/671
[58] Field of Search ............ 222/146.6, 236, 239-242, 222/412, 413. 510, 527, 564, 575; 221/266, 261, 267; 198/666, 657, 658, 659, 676, 550.1, 671; 62/344, 66, 265, 266

[56] References Cited

U.S. PATENT DOCUMENTS

| | | |
|---|---|---|
| 3,437,244 | 4/1969 | Alvarez et al. . |
| 3,570,720 | 3/1971 | Curry, III .............................. 222/240 |
| 3,602,406 | 8/1971 | Jacobus ................................ 222/413 |
| 3,798,923 | 3/1974 | Pink et al. . |
| 3,874,559 | 4/1975 | Pink . |
| 3,881,642 | 5/1975 | Hoenisch . |
| 4,176,527 | 12/1979 | Lindstromberg et al. ..... 222/240 X |
| 4,619,380 | 10/1986 | Brooks ................................. 222/240 |
| 4,627,556 | 12/1986 | Brooks . |
| 4,942,979 | 7/1990 | Lindstromberg et al. ..... 222/240 X |

Primary Examiner—Michael S. Huppert
Assistant Examiner—Kenneth De Rosa
Attorney, Agent, or Firm—Wood, Phillips, Mason, Recktenwald & VanSanten

[57] ABSTRACT

An ice dispensing apparatus includes a rotatable drum dispenser and an adjacent floating baffle, the baffle having an opening for ice bodies to pass from the drum dispenser to an ice crusher mechanism. The drum dispenser has blade augers spaced from the baffle a select distance and operate in connection with the baffle opening to prevent wedging of ice bodies.

22 Claims, 2 Drawing Sheets

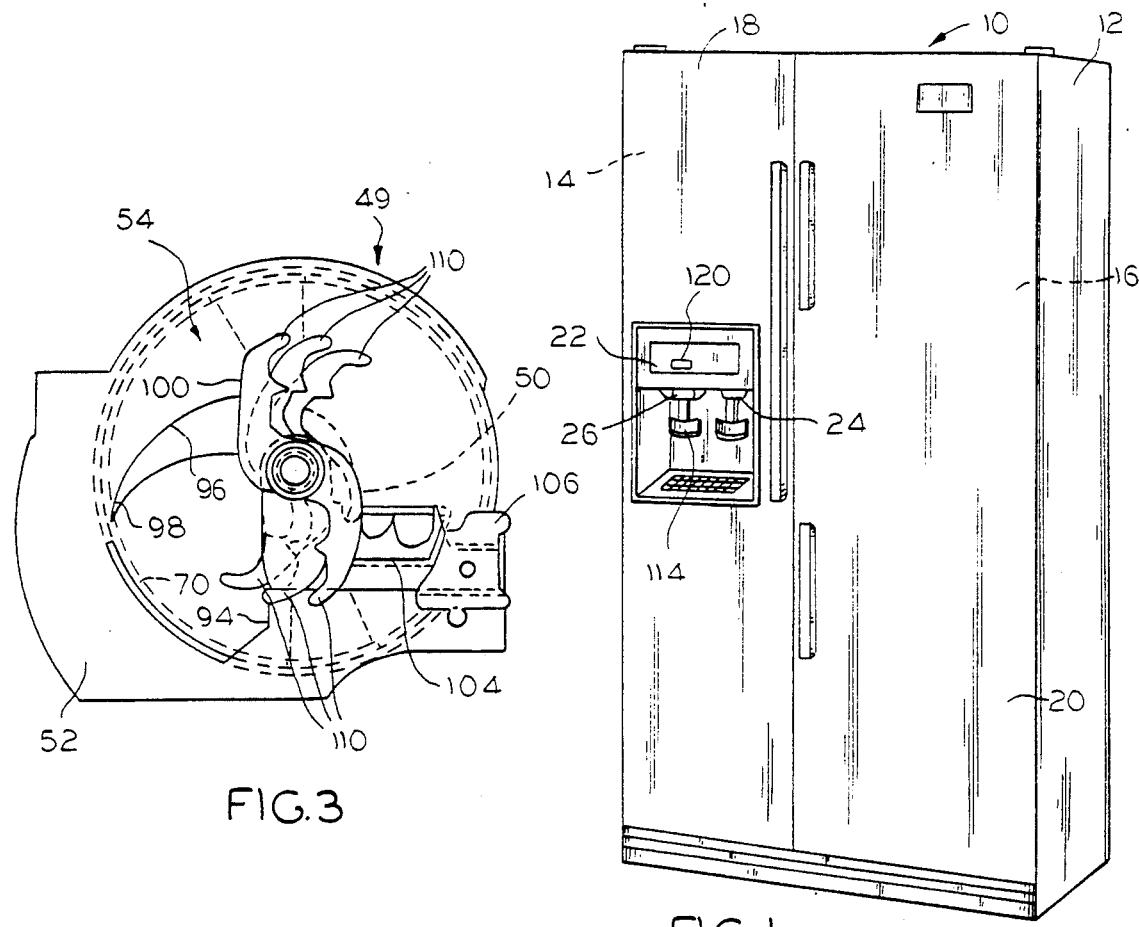
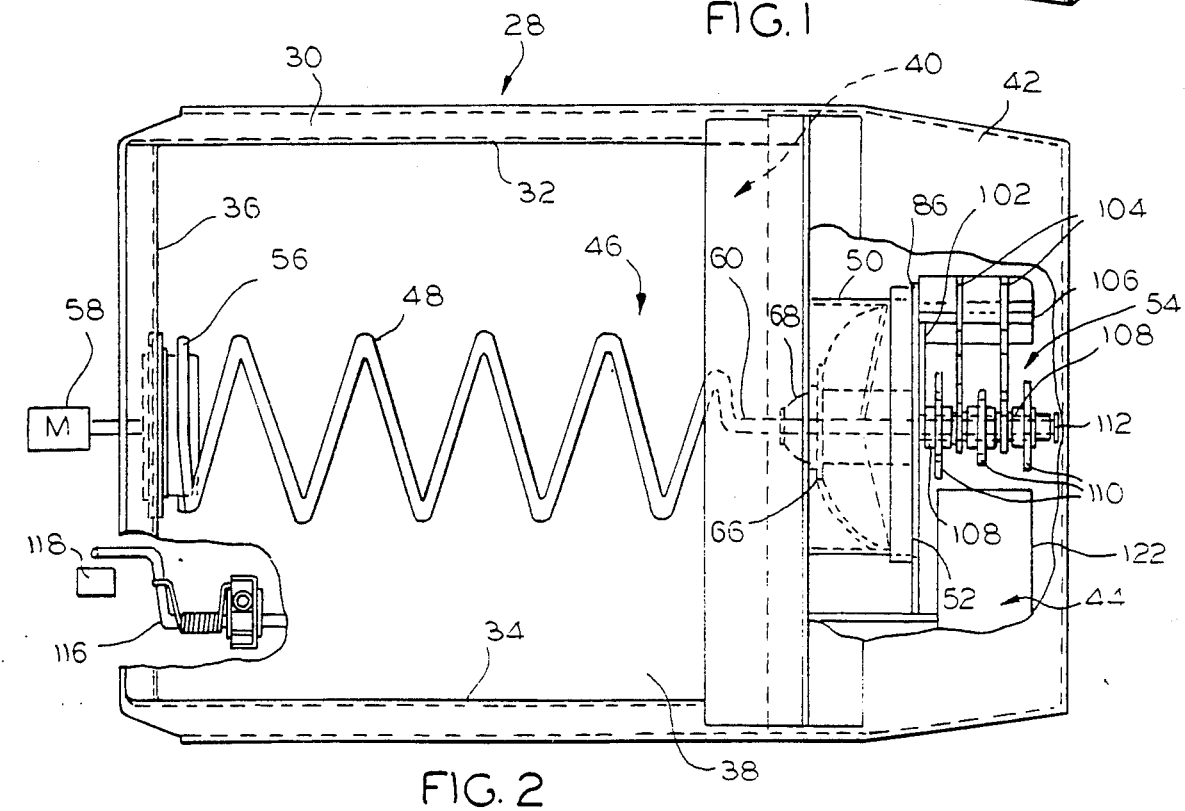

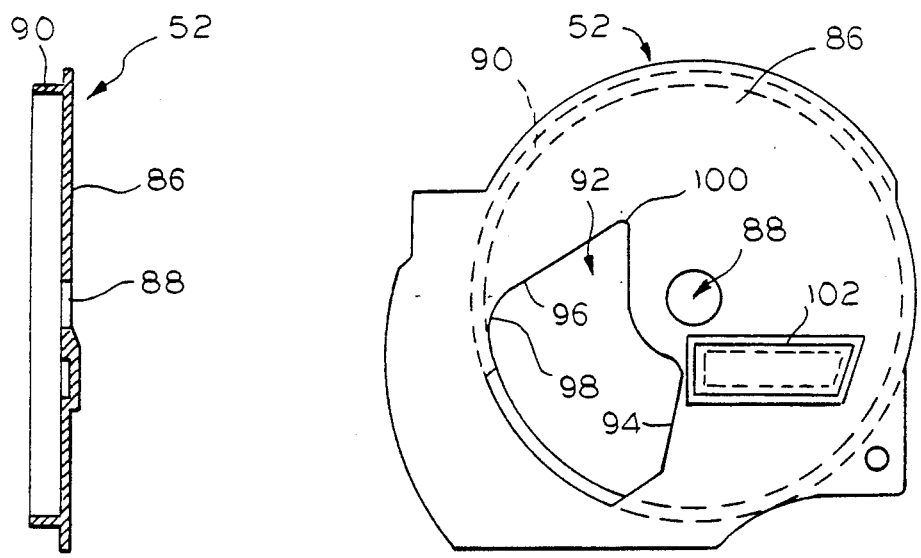
FIG.5   FIG.4
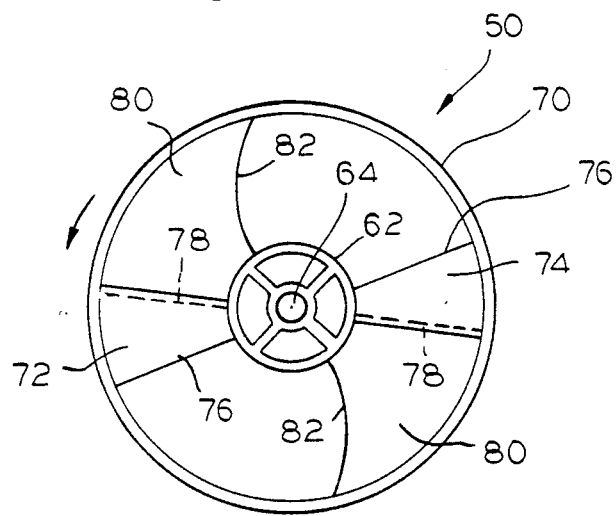 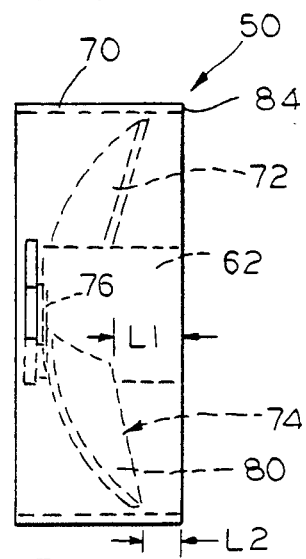
FIG.6   FIG.7
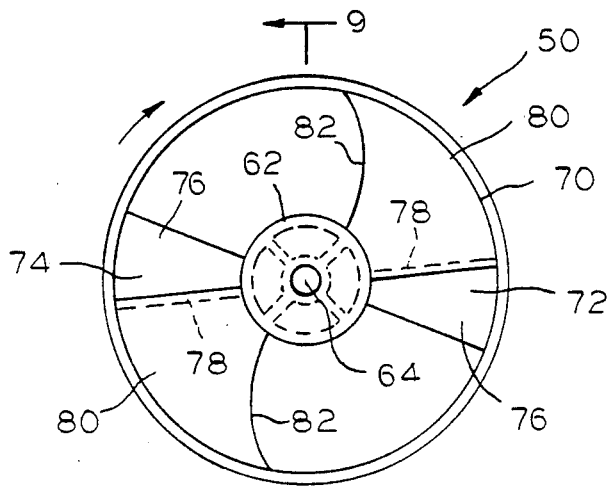 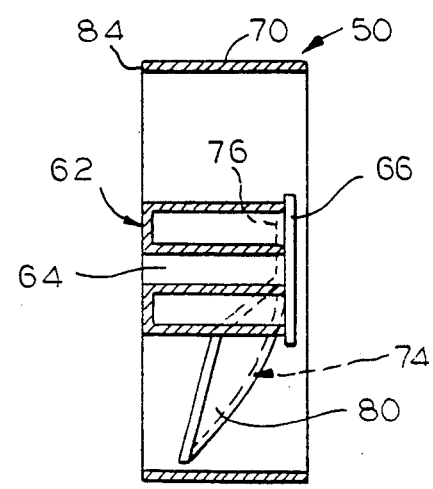
FIG.8   FIG.9

ICE DISPENSER CONVEYING APPARATUS HAVING A ROTATING BLADE AUGER THAT OPERATES IN CONNECTION WITH A BAFFLE OPENING TO PREVENT WEDGING OF ICE BODIES THEREBETWEEN

FIELD OF THE INVENTION

This invention relates to an ice dispensing apparatus and, more particularly, to an improved conveying means therefor.

BACKGROUND OF THE INVENTION

In one form of ice body making apparatus, an automatic apparatus is provided for forming ice bodies and periodically delivering the formed ice bodies into a subjacent container maintained within a freezer space of a refrigeration apparatus. In one conventional form, the ice bodies are removed from the container by a user grasping the ice bodies through an open top of the container and removing the desired quantity.

In another form of a refrigeration apparatus, a through the door ice dispenser is provided for automatically delivering the desired quantity of formed ice bodies from the container into a suitable receptacle, such as a glass or pitcher. Such an apparatus includes a conveying means for conveying ice bodies stored in the container to a discharge chute in the door. One example of such an automatic ice body dispenser is shown in Buchser U.S. Pat. No. 4,084,725, which is owned by the assignee of the present invention. As disclosed therein, the ice bodies are delivered from the container to a transfer mechanism by means of an auger which is rotated by a motor at the rear end of the auger. The forward end of the auger is connected to the transfer mechanism which transfers the ice bodies seriatum to a subjacent transfer chute leading to the dispensing area. Actuation of the drive motor may be effected by suitable switches connected to dispensing means at the dispensing position adapted to engaged by the glass or pitcher ice body collector, so that the desired quantity of ice bodies may be automatically transferred by the maintained energization of the drive motor.

A typical transfer mechanism includes a drum conveyor comprising a cylinder surrounding helical blade augers. A baffle is disposed immediately outwardly of the drum conveyor and includes an opening through which ice bodies conveyed by the drum conveyor may pass for delivery to the transfer chute. It has been found that under certain operating conditions the ice bodies may wedge between the blade augers and the baffle. Particularly, ice bodies can become entrapped between an outlet edge of the drum blade auger and a cutoff edge of the opening through the baffle. This wedging action could cause damage to the ice dispensing apparatus as well as damage to a motor drive therefor.

The present invention is intended to overcome one or more of the problems discussed above.

SUMMARY OF THE INVENTION

There is disclosed herein an ice dispenser for a refrigeration apparatus including means for preventing ice bodies from wedging therein.

Broadly, there is disclosed herein an ice dispenser for a refrigeration apparatus which includes a container for storing ice bodies. A housing is secured at a front opening of the container and has a dispensing space for dispensing ice bodies. An ice conveyor for transferring ice bodies stored in the conveyor to the dispensing area includes a wire auger, a rotatable drum dispenser and a baffle. The wire auger has an inner end rotatably coupled at a rear wall of the container and an outer end. The drum dispenser is enclosed in the housing and has a center hub receiving the wire auger outer end and being rotatable therewith. A cylindrical outer wall is coaxial with the hub, and a pair of opposed, helical blade augers extend between the hub and the cylindrical outer wall. The blade augers have outer edges spaced inwardly from an outer edge of the outer wall. The baffle is mounted outwardly of the drum dispenser, in the housing, and includes a planar outer wall having a center coaxial with the hub, the planar wall having an enlarged through opening disposed between the drum dispenser and the dispensing space. The opening is generally arcuate and extends partially about the center, and has a cutoff edge oriented away from the center from a point adjacent the drum dispenser outer wall to a point adjacent to the hub. A drive means is provided for rotating the wire auger and the drum dispenser to deliver ice bodies from the container to the dispensing space, whereby the spacing of the blade at auger outer edges and the orientation of the opening cutoff edge prevents ice bodies from wedging between the blade augers and the baffle.

It is a feature of the invention that the blade auger outer edges have a concave curvature.

It is another feature of the invention that the spacing is selected to correspond to a select dimension of the ice bodies.

It is a further feature of the invention that the baffle comprises a flexible baffle which flexes responsive to forces produced by an ice body to further prevent wedging.

It is still another feature of the invention that the baffle is loosely mounted relative to the drum dispenser to float responsive to forces produced by an ice body to further prevent wedging.

It is yet another feature of the invention that the ice dispenser further comprises an ice crusher mechanism mounted in the housing between the baffle opening and the dispensing space.

More specifically, the structure disclosed herein includes a rotatable drum dispenser, and an adjustable floating baffle, the baffle having an opening for ice cubes to pass from the drum dispenser to an ice crusher mechanism located downstream from the floating baffle. The drum dispenser includes a center hub for mounting on a drive shaft, and a pair of opposed, helical blade augers extending between the hub and a cylindrical outer wall. The helical blade augers have a concave curvature along their outer or trailing edge to assist in the transfer of the ice bodies from the storage container to the ice crusher chamber. Further, the edges of the helical blade augers are spaced inwardly from the drum dispenser outer edge a greater distance at the hub than at the cylindrical outer wall. Particular distances are selected according to the size and shape of the ice bodies to be dispensed.

The floating baffle, in which the drum dispenser rotates during the ice body transfer, is loosely mounted on only two points, on the drive shaft and on a cutting blade mount post. Therefore, the baffle can float and shift its position a certain amount in response to forces generated during ice transfer conditions. This flexible response further aids in preventing ice body wedging.

The floating baffle includes a large opening on one side for exit of the ice bodies The opening is provided with a cutoff edge to facilitate ice body exit. The floating baffle also includes a rectangular outwardly extending protrusion to reduce the space between the face of the floating baffle and the first stationary cutting blade of the ice crusher to aid in guiding ice bodies through the ice crushing chamber Further features and advantages of the invention will readily be apparent from the specification and from the drawings.

BRIEF DESCRIPTION OF THE DRAWINGS

FIG. 1 is a perspective view of a refrigeration apparatus including a through the door ice and water dispenser;

FIG. 2 is a plan view of an ice container assembly embodying the invention;

FIG. 3 is a front view of a transfer mechanism of the ice container assembly of FIG. 2;

FIG. 4 is a front view of a floating baffle of the transfer mechanism of FIG. 3;

FIG. 5 is a sectional view taken along the line 5—5 of FIG. 4;

FIG. 6 is an inner elevational view of a rotatable drum dispenser of the transfer mechanism of FIG. 3;

FIG. 7 is a side elevational view taken along the line 7—7 of FIG. 6;

FIG. 8 is an outer elevational view of the drum dispenser of FIG. 6; and

FIG. 9 is a sectional view taken along the line 9—9 of FIG. 8.

DETAILED DESCRIPTION OF THE INVENTION

With reference to FIG. 1, a refrigeration apparatus 10, comprising a side-by-side refrigerator/freezer, includes a cabinet 12 providing a below-freezing, or freezer, compartment 14, and an above-freezing, or fresh food, compartment 16. Access to the compartments 14 and 16 is had through respective freezer and refrigerator doors 18 and 20 hingedly mounted to the cabinet 12, as is well known. The freezer door 18 is provided with a through the door ice and water dispenser 22. Specifically, the dispenser 22 includes a water chute 24 through which water is automatically transferred to any receptacle positioned therebelow, and an ice chute 26 through which ice bodies may be automatically transferred. In the illustrated embodiment, the ice bodies may be fully formed ice bodies or crushed ice bodies.

Although not shown, the freezer compartment 14 houses a conventional ice body making apparatus which delivers formed ice bodies into a subjacent ice container assembly 28, see FIG. 2, embodying the invention.

The ice container assembly 28 comprises a container 30 for storing formed ice bodies. The container 30 has opposite side walls 32 and 34 connected to a rear wall 36, each of which are connected to a bottom wall 38. A front access opening 40 is provided between the bottom wall 38, and the opposite side walls 32 and 34. A housing 42 is secured at the front opening 40 and includes a lower open dispensing space 44 for delivering formed or crushed ice bodies to the ice chute 26, see FIG. 1. Particularly, with the freezer door 18 in the closed position, the dispensing space 44 is located immediately above the ice chute 26. The ice container assembly 28 includes an ice conveyor 46 for transferring ice bodies stored in the container 30 to the dispensing space 44.

The ice conveyor 46 comprises a wire auger 48 drivingly connected to a transfer mechanism 49. The transfer mechanism 49 includes a rotatable drum dispenser 50, a floating baffle 52, and an optional ice crusher 54.

The wire auger 48 comprises an elongated wire helically wound to form a spiral and having an inner end 56 mounted at the container rear wall 36. Specifically, the inner end 56 is operatively connected to an output shaft of a motor drive 58 for rotating the wire auger 48. The wire auger 48 includes an outer end defining an elongate drive shaft 60 extending through the drum dispenser 50, the floating baffle 52 and the ice crusher 54.

The drum dispenser 50 is made of a rigid plastic such as, for example, acetal. With reference also to FIGS. 6-9, the drum dispenser 50 includes a center hub 62 provided with a central axial opening 64. The opening 64 receives the drive shaft 60, see FIG. 2. A drive bar 66 connects the drum dispenser 50 to the drive shaft 60 for rotation therewith and a feeder cone 68 inwardly of the drive bar 66 facilitates transfer of ice bodies from the wire auger 48 to the drum dispenser 50 A cylindrical outer wall 70 is coaxial with the hub 62. A pair of opposed, helical blade augers 72 and 74 extend between the hub 62 and the cylindrical outer wall 70.

Each blade auger 72 and 74 includes an inner, planar end 76 turned outwardly at 78 to a helix drop portion 80. Each helix drop portion 80 has an outer edge 82 having a concave curvature of a select radius. The blade auger outer edge 82 is spaced inwardly from an outer edge 84 of the cylindrical outer wall 70. Specifically, the axial spacing from the outer wall edge 84 to the blade auger outer edge 82 is greater at the hub 62 than at the outer wall 70. More specifically, and with reference to FIGS. 7 and 9, a distance L1 at the hub 62 is greater than a distance L2 at the cylindrical outer wall 70. In the illustrated embodiment, the distance L2 is approximately equal to ½ inch, and the distance L1 is approximately equal to ¾ inch, to accommodate ice bodies having a width and height of approximately ¾ inch.

With reference to FIGS. 4 and 5, the baffle 52 includes a planar outer wall 86 having a central opening 88. A relatively short, inwardly directed cylindrical wall 90 is connected at the rear side of the outer wall 86. The cylindrical wall 90 has an inner diameter greater than an outer diameter of the drum dispenser outer wall 70 for receiving the same, as described below. An enlarged opening 92 is provided through the outer wall 86 disposed within the cylindrical wall 90 and to the left of the center of the central opening 80, as illustrated in FIG. 4. The enlarged opening 92 is generally arcuate shaped and extends only partially about the center opening 88. The opening 92 has a generally radially oriented leading edge 94 and a cutoff edge 96. The cutoff edge 96 is oriented away from the center opening 88 and opposite the leading edge 94. Specifically, with the drum conveyor 50 received in the cylindrical wall 90, the cutoff edge 96 extends from a point 98 adjacent the drum dispenser outer wall 70 to a point 100 adjacent the drum dispenser hub 62, see FIG. 3.

The particular location of the opening 92 is selected according to the direction of rotation of the drum dispenser 50 and the position of the dispensing space 44, as is apparent.

The baffle 52 also includes a somewhat rectangular protrusion 102 to reduce the axial space between the face of the outer wall 86 and the ice crusher 54, see FIG. 2, to aid in guiding ice bodies through the ice crusher 54.

With particular reference to FIGS. 2 and 3, the ice crusher 54 includes a pair of stationary cutting blades 104 mounted to a mounting block 106. A plurality of spacers 108 and staggered rotational cutting blades 110 are alternately mounted to the drive shaft 60. A nut bearing 112 is provided for securing the spacers 108 and blades 110 to the drive shaft 60. As is conventional, rotation of the drive shaft 60 causes rotation of the cutting blades 110 in the clockwise direction, as viewed in FIG. 3. As ice bodies are presented at the baffle opening 92 when crushed ice is selected the rotational blades 110 carry the ice bodies around to the stationary blades 104. The blades 104 and 110 together act to cut up the ice bodies to provide crushed ice.

The drum dispenser 50, baffle 52 and ice crusher 54 are disposed within the housing 42. The drum dispenser 50 is carried and driven by the drive shaft 60. The floating baffle 52 is loosely mounted on the drive shaft 60 and to the blade mounting block 106. As a result, the baffle 52 floats and shifts its position relative to the drum dispenser 50 and ice crusher 54. This flexible response helps to prevent ice bodies from wedging between the drum dispenser 50 and the baffle 52.

In operation, and assuming that the container 30 includes a supply of ice bodies, a user may cause operation to deliver ice bodies to the chute 26 as by positioning a glass or other container below the chute 26 to actuate a lever 114, see FIG. 1. The lever 114 is operatively connected to a spring actuated control arm 116, see FIG. 2, which switch (not shown) is for energizing the motor 58. A crushed ice/cube selector switch 120 on the door is connected in series with the motor switch to a solenoid 118. If cubes are selected then the solenoid 118 is energized to pivot a door 122 downwardly to allow cubes to pass directly to the dispensing space 44. If crushed ice is selected, then the solenoid 118 is deenergized, and the door 122 causes the cubes to be conveyed to the ice crusher 54 prior to dispensing.

Energization of the motor 58 causes the wire auger 48 and drive shaft 60, and thus the drum dispenser 50 and the ice crusher rotary blades 110, to rotate. The wire auger 48 is operable to move ice bodies in an outward direction towards the drum dispenser 50. Specifically, as ice bodies approach the wire auger outer drive shaft 60, they are directed by the feeder cone 68 into the drum dispenser 50. The auger blade inner flat portions 76 act to direct ice bodies toward an outer surface of the helix drop portions 80 to continue to transfer the ice bodies in the outward direction. As ice bodies are conveyed by the helical drop portions 80, at some point during the revolution they encounter the baffle opening 92. In the cube mode, the ice bodies will drop through the opening 92 and into the dispensing space 44. In the crushed ice mode, the ice bodies passing through the opening 92 are impeded by the door 122 and are captured by the blades 110 and carried around to the fixed blades 104. The interaction between the rotary blades 110, the fixed blades 104 and the ice bodies causes the ice bodies to be crushed and then delivered to the dispensing space 44 for delivery to the chute 26, see FIG. 1.

The axial spacing between the blade outer edges 82 and the cylindrical outer wall outer edge 84, and thus the floating baffle 52, is provided to prevent ice bodies from wedging therebetween. Specifically, the use of the spacing L1 being greater than the spacing L2, as well as the orientation of the opening cutoff edge 96, as discussed above, causes ice bodies transferred by rotation of the drum dispenser 50 to slide along the cutoff edge 96 radially inwardly toward the hub 62 to allow the ice body to fall through the opening 92, or to cause the ice body to be forced back into the drum dispenser 50 owing to the larger space L1 at the hub, so as to prevent ice bodies from wedging between the blade augers 72 and 74 and the baffle 52. More specifically, an ice body will normally position itself at the lower point of rotation and thus be adjacent the drum dispenser outer wall 70. As the drum dispenser 50 continues to rotate, the orientation of the opening cutoff edge 96 conveys the ice body radially inwardly where there is a greater space L1 provided between the blade outer edge 82 and the floating baffle 52. The spacing L1 is selected to be sufficient to allow an ice body to pass therebetween. Further, the baffle 52 is formed of a flexible material so that forces caused by ice bodies beginning to wedge therebetween will cause the baffle to flex to further prevent wedging. Also, the floating structure provided between the drum dispenser 50 and the baffle 52 prevents wedging, as discussed above.

Additionally, the use of the concave curvature at the edge 82 facilitates movement of the ice bodies radially inwardly.

Thus, the invention broadly comprehends an ice dispensing apparatus including a drum dispenser having blade augers spaced from a floating baffle having a cutoff edge oriented to operate in connection with the described spacing to prevent wedging of ice bodies therebetween.

I claim:

1. An ice dispenser for a refrigeration apparatus comprising:
   a container for storing ice bodies, said container having a front access opening;
   a housing secured at the front access opening of said container and having a dispensing space for dispensing ice bodies;
   an ice conveyor for transferring ice bodies stored in said container to said dispensing space, including
     a wire auger having an inner end rotatably coupled at a rear wall of said container and an outer end,
     a rotatable drum dispenser enclosed in said housing and having a center hub receiving said wire auger outer end and being rotatable therewith, a cylindrical outer wall coaxial with said hub, and a pair of opposed, helical blade augers extending between the hub and the cylindrical outer wall, the blade augers having outer edges spaced inwardly from an outer edge of said outer wall, and
   a baffle mounted outwardly of said drum dispenser in said housing and including a planar outer wall having a center coaxial with said hub, said planar wall having an enlarged opening therethrough disposed between said drum dispenser and said dispensing space, the opening being generally arcuate and extending partially about said center, and having a cutoff edge extending from a first point adjacent the drum dispenser outer wall to a second point and forming an acute angle with a first radius drawn from the hub to the first point across said opening, the second point being intermediate the hub and the drum dispenser outer wall on a second radius angularly displaced from said first radius; and drive means for rotating said wire auger and said drum dispenser to deliver ice bodies from said container to said dispensing space, whereby the spacing of said blade auger outer edges and the orientation of said opening cutoff edge prevent ice bodies from wedging between said blade augers and said baffle.

2. The ice dispenser of claim 1 wherein said blade auger outer edges have a concave curvature.

3. The ice dispenser of claim 1 wherein said spacing is selected to correspond to a select dimension of the ice bodies.

4. The ice dispenser of claim 1 wherein said baffle comprises a flexible baffle which flexes responsive to forces produced by an ice body to further prevent wedging.

5. The ice dispenser of claim 1 wherein said baffle is loosely mounted relative to said drum dispenser to float responsive to forces produced by an ice body to further prevent wedging.

6. The ice dispenser of claim 1 further comprising an ice crusher mounted in said housing between the baffle opening and the dispensing space.

7. A conveying means for delivering ice bodies stored in a container to an ice crusher, said container having a front access opening and a housing secured at the front access opening enclosing said ice crusher, comprising:

a wire auger having an inner end rotatably coupled at a rear wall of said container and an outer end;

a rotatable drum dispenser enclosed in said housing and having a center hub receiving said wire auger outer end and being rotatable therewith, a cylindrical outer wall coaxial with said hub, and a pair of opposed, helical blade augers extending between the hub and the cylindrical outer wall, the blade augers having outer edges spaced inwardly from an outer edge of said outer wall;

a baffle mounted outwardly of said drum dispenser in said housing and including a planar outer wall having a central opening coaxial with said hub through which said wire auger outer end extends, said planar wall having an enlarged opening therethrough disposed between said drum dispenser and said dispensing space, the opening being generally arcuate and extending partially about said central opening, and having a cutoff edge extending from a first point adjacent the drum dispenser outer wall to a second point and forming an acute angle with a first radius drawn from the hub to the first point across said opening, the second point being intermediate the hub and the drum dispenser outer wall on a second radius angularly displaced from said first radius;

means for securing said ice crusher for rotation with the outer end of said wire auger; and drive means for rotating said wire auger, said ice crusher and said drum dispenser to deliver ice bodies from said container to said ice crusher, whereby the spacing of said blade auger outer edges and the orientation of said opening cutoff edge prevent ice bodies from wedging between said blade augers and said baffle.

8. The conveying means of claim 7 wherein said blade auger outer edges have a concave curvature.

9. The conveying means of claim 7 wherein said spacing is selected to correspond to a select dimension of the ice bodies.

10. The conveying means of claim 7 wherein said baffle comprises a flexible baffle which flexes responsive to forces produced by an ice body to further prevent wedging.

11. The conveying means of claim 7 wherein said baffle is loosely mounted relative to said drum dispenser to float responsive to forces produced by an ice body to further prevent wedging.

12. An ice dispenser for a domestic refrigeration apparatus comprising:

a container for storing ice bodies, said container having a front access opening;

a housing secured at the front access opening of said container and having a dispensing space for dispensing ice bodies;

an ice conveyor for transferring ice bodies stored in said container to said chute, including a wire auger having an inner end mounted at a rear wall of said container for rotation relative thereto, and an outer end, a rotatable drum dispenser enclosed in said housing and having a center hub receiving said wire auger outer end and being rotatable therewith, a cylindrical outer wall coaxial with said hub, and a pair of opposed, helical blade augers extending between the hub and the cylindrical outer wall, the blade augers having outer edges spaced inwardly from an outer edge of said outer wall, the spacing being greater at the hub than at the cylindrical outer wall, and a baffle mounted outwardly of said drum dispenser in said housing and including a planar outer wall having a center coaxial with said hub and an inwardly directed cylindrical wall loosely receiving said drum, said planar wall having an enlarged opening therethrough in communication with said chute, the opening being generally arcuate and extending partially about said center, the enlarged opening having a generally radially extending from a first point adjacent the drum dispenser outer wall to a second point and forming an acute angle with a first radius drawn from the hub to the first point across said opening, the second point being intermediate the hub and the drum dispenser outer wall on a second radius angularly displaced from said first radius; and drive means for rotating said wire auger and said drum dispenser to deliver ice bodies from said container to said chute, whereby the spacing of said blade auger outer edges and the orientation of said opening cutoff edge cause ice bodies transferred by rotation of said drum dispenser to slide along said cutoff edge radially inwardly toward said hub to allow the ice body to fall through said opening or to be forced back into said drum dispenser so as to prevent ice bodies from wedging between said blade augers and said baffle.

13. The ice dispenser of claim 12 wherein said blade auger outer edges have a concave curvature.

14. The ice dispenser of claim 12 wherein said spacing is selected to correspond to a select dimension of the ice bodies.

15. The ice dispenser of claim 12 wherein said baffle comprises a flexible baffle which flexes responsive to forces produced by an ice body to further prevent wedging.

16. The ice dispenser of claim 12 wherein said baffle is loosely mounted relative to said drum dispenser to float responsive to forces produced by an ice body to further prevent wedging.

17. The ice dispenser of claim 12 further comprising an ice crusher mechanism mounted in said housing between the baffle opening and the dispensing space.

18. In an ice conveying means for delivering ice bodies stored in a container to an ice crusher, said container having a front access opening and a housing secured at the front access opening housing said ice crusher, and including a rotatable drum dispenser enclosed in said housing and having a center hub, a cylindrical outer wall coaxial with said hub, and a pair of opposed, helical blade augers extending between the hub and the cylindrical outer wall, the blade augers having outer edges spaced inwardly from an outer edge of said outer wall, the improvement comprising:

a baffle mounted outwardly of said drum dispenser in said housing and including a planar outer wall having a central opening coaxial with said hub, said planar wall having an enlarged opening therethrough disposed between said drum dispenser and said ice crusher, the opening being generally arcuate and extending partially about said central opening, and having a cutoff edge extending from a first point adjacent the drum dispenser outer wall to a second point and forming an acute angle with a first radius drawn from the hub to the first point across said opening, the second point being intermediate the hub and the drum dispenser outer wall on a second radius angularly displaced from said first radius, whereby the spacing of said blade auger outer edges and the orientation of said opening cutoff edge causes ice bodies transferred by rotation of said drum dispenser to slide along said cutoff edge radially inwardly toward said hub to allow the ice body to all through said opening or to be forced back into said drum dispenser so as to prevent ice bodies from wedging between said blade augers and said baffle.

19. The improvement of claim 18 wherein said blade auger outer edges have a concave curvature.

20. The improvement of claim 18 wherein said spacing is selected to correspond to a select dimension of the ice bodies.

21. The improvement of claim 18 wherein said baffle comprises a flexible baffle which flexes responsive to forces produced by an ice body to further prevent wedging.

22. The improvement of claim 18 wherein said baffle is loosely mounted relative to said drum dispenser to float responsive to forces produced by an ice body to further prevent wedging.

* * * * *